United States Patent
Langley

(10) Patent No.: US 9,786,940 B2
(45) Date of Patent: Oct. 10, 2017

(54) CHLORINATION OF PROCESSING RESIDUES AS A VARIABLE LOAD FOR GRID SCALE ELECTRICAL LOAD FOLLOWING AND STORAGE

(71) Applicant: Justin Langley, Fargo, ND (US)

(72) Inventor: Justin Langley, Fargo, ND (US)

( * ) Notice: Subject to any disclaimer, the term of this patent is extended or adjusted under 35 U.S.C. 154(b) by 0 days.

(21) Appl. No.: 15/103,876

(22) PCT Filed: Jan. 18, 2016

(86) PCT No.: PCT/US2016/013811
§ 371 (c)(1),
(2) Date: Jun. 12, 2016

(87) PCT Pub. No.: WO2016/122917
PCT Pub. Date: Aug. 4, 2016

(65) Prior Publication Data
US 2017/0025695 A1 Jan. 26, 2017

Related U.S. Application Data

(60) Continuation of application No. 14/852,028, filed on Sep. 11, 2015, which is a division of application No.
(Continued)

(30) Foreign Application Priority Data

Jan. 28, 2015 (AU) ................................ 2013299655
Feb. 4, 2015 (CA) ...................................... 2881187

(51) Int. Cl.
*C01B 3/34* (2006.01)
*H01M 8/0612* (2016.01)
(Continued)

(52) U.S. Cl.
CPC .......... *H01M 8/0618* (2013.01); *B01D 47/00* (2013.01); *B01D 53/326* (2013.01); *C01B 3/00* (2013.01);
(Continued)

(58) Field of Classification Search
CPC ............. H01M 8/06; C22B 4/00; C22B 21/06
See application file for complete search history.

(56) References Cited

U.S. PATENT DOCUMENTS

| | | |
|---|---|---|
| 3,317,414 A | 5/1967 | Fougner |
| 4,355,008 A | 10/1982 | Dunn, Jr. |

(Continued)

FOREIGN PATENT DOCUMENTS

| | | |
|---|---|---|
| WO | WO 99/37823 | 7/1999 |
| WO | WO 2014/025904 | 2/2014 |

*Primary Examiner* — Arun S Phasge
(74) *Attorney, Agent, or Firm* — Danielson Legal LLC

(57) ABSTRACT

Disclosed are systems and methods having inherent carbon capture and conversion capabilities offering maximum flexibility, efficiency, and economics while simultaneously enabling environmentally and sustainably sound practices. A hybrid thermochemical cycle couples staged reforming with hydrogen production and residue chlorination. The residues of the upgrading are chlorinated, metals of interest are removed and bulk material is re-mineralized. Through the residue chlorination process, various metals including rare earths are concentrated and extracted. Energy is retained through chemical synthesis such as hydrocarbon and metal and non-metal chloride production. Produced chemicals are later exploited by redox reactions in the operation of an integrated gasification flow battery.

21 Claims, 1 Drawing Sheet

Related U.S. Application Data

14/240,569, filed as application No. PCT/US2013/053980 on Aug. 7, 2013, now Pat. No. 9,163,297.

(51) Int. Cl.

| | |
|---|---|
| *B01D 47/00* | (2006.01) |
| *C01B 3/00* | (2006.01) |
| *C10G 1/00* | (2006.01) |
| *C10J 3/84* | (2006.01) |
| *C10J 3/86* | (2006.01) |
| *C10L 3/08* | (2006.01) |
| *C22B 1/08* | (2006.01) |
| *C22B 59/00* | (2006.01) |
| *B01D 53/32* | (2006.01) |
| *C01B 3/02* | (2006.01) |
| *H01M 8/0662* | (2016.01) |
| *H01M 8/14* | (2006.01) |
| *H01M 8/18* | (2006.01) |
| *H01M 8/20* | (2006.01) |

(52) U.S. Cl.
CPC ............... *C01B 3/02* (2013.01); *C01B 3/34* (2013.01); *C01B 3/348* (2013.01); *C10G 1/002* (2013.01); *C10J 3/84* (2013.01); *C10J 3/86* (2013.01); *C10L 3/08* (2013.01); *C22B 1/08* (2013.01); *C22B 59/00* (2013.01); *H01M 8/0675* (2013.01); *H01M 8/14* (2013.01); *H01M 8/188* (2013.01); *H01M 8/20* (2013.01); *C01B 2203/02* (2013.01); *C01B 2203/0233* (2013.01); *C01B 2203/06* (2013.01); *C01B 2203/0833* (2013.01); *C01B 2203/1235* (2013.01); *C01B 2203/84* (2013.01); *C10J 2200/12* (2013.01); *C10J 2300/16* (2013.01); *C10J 2300/1643* (2013.01); *C10J 2300/1646* (2013.01); *Y02E 60/324* (2013.01); *Y02W 30/54* (2015.05)

(56) References Cited

U.S. PATENT DOCUMENTS

| | | | |
|---|---|---|---|
| 6,066,307 | A | 5/2000 | Keskar et al. |
| 9,163,297 | B2 * | 10/2015 | Langley ............. C10G 1/002 |
| 2007/0224109 | A1 | 9/2007 | Chaifez et al. |
| 2014/0023573 | A1 | 1/2014 | Flynn |

* cited by examiner

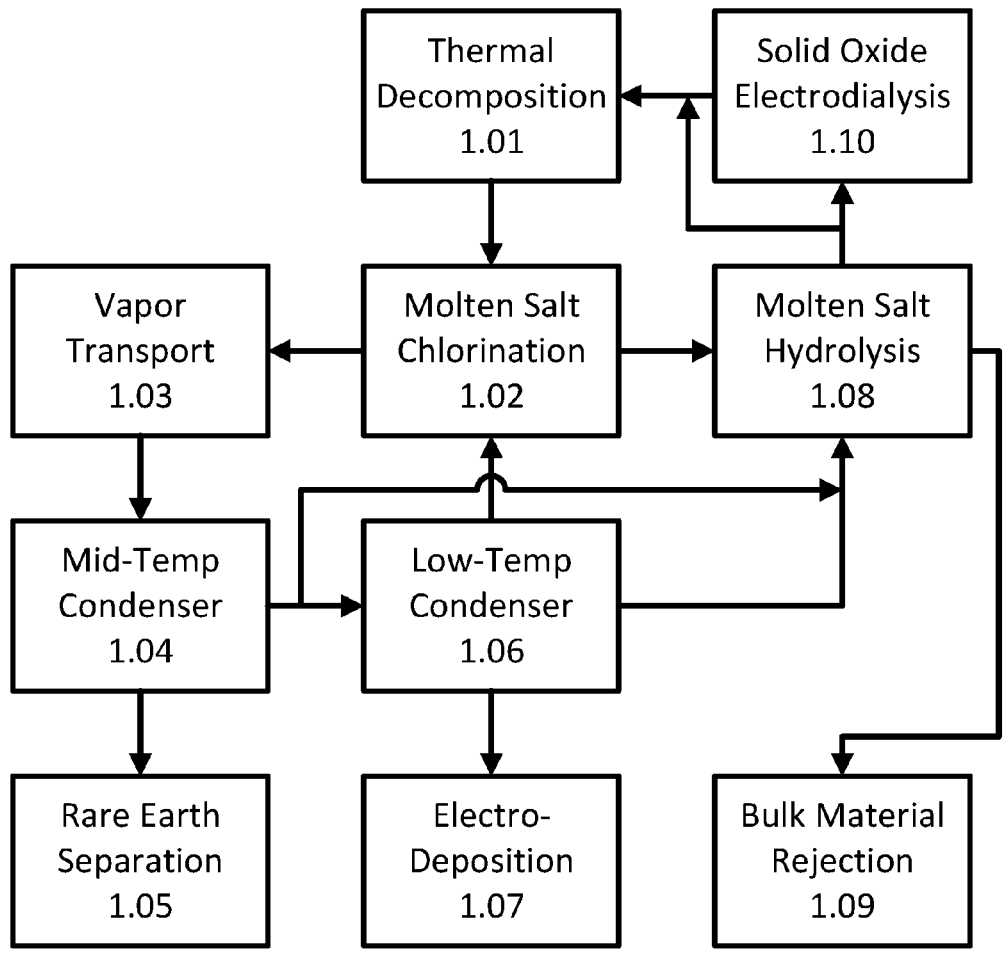
Figure 1 - Process Flow Chart
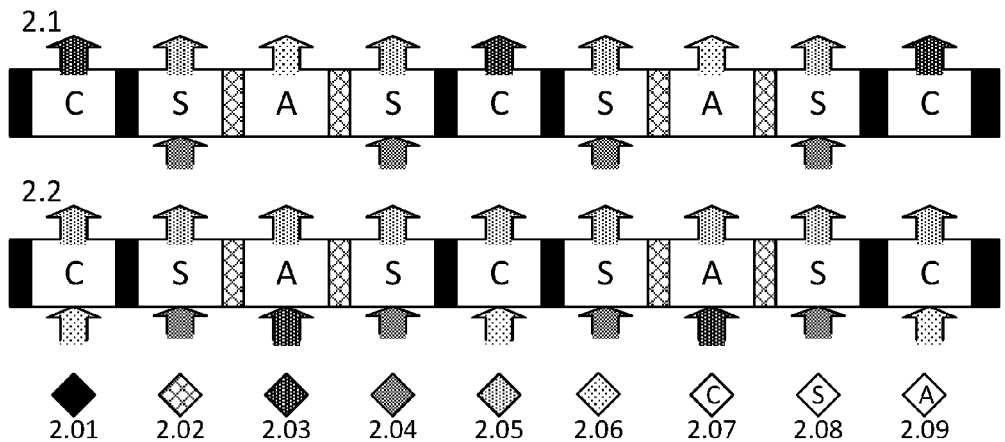
Figure 2 – Electrodialysis Stack

CHLORINATION OF PROCESSING RESIDUES AS A VARIABLE LOAD FOR GRID SCALE ELECTRICAL LOAD FOLLOWING AND STORAGE

CROSS-REFERENCE TO RELATED APPLICATIONS

This application is the national phase of International (PCT) Patent Application No. PCT/US16/13811, filed on Jan. 18, 2016, which claims priority to each of pending Australian Patent Application No. 2013299655, filed on Jan. 28, 2015; pending Canadian Patent Application No. 2,881,187, filed Feb. 4, 2015; and pending U.S. patent application Ser. No. 14/852,028, filed on Sep. 11, 2015

FIELD

Embodiments of the present invention relate generally to systems and methods for improved material utilization in industrial processing. More specifically, embodiments of the present invention address existing challenges with carbon and waste stream management of major processes of the petrochemical, metallurgical, and electrical generation and distribution industries. More specifically still, embodiments of the present invention integrate processing residue chlorination with petrochemical and electrical production for the recovery of valuable metals as a variable load ideal for new plant design or retrofit.

BACKGROUND

Rising demand for fossil fuels, exasperated by rapidly developing nations, is driving the need for more efficient utilization of limited natural resources in conjunction with the development of alternative energy sources. Many modern advances in long utilized petrochemical practices such as gasification and hydrotreatment are enabling the cost effective utilization of so called unconventional fuels. Hybrid designs enable the conversion of non-conventional fuels such as coal and natural gas as well as biomass and waste to be converted to direct replacements or additives for petrochemicals conventionally derived from oil. Light hydrocarbons produced during this conversion process can be utilized in clean burning peak generation or fed back into the upgrading process. Still other designs are capable of utilizing carbon dioxide as a carbon source for conversion to synthetic fuels, oils, and other carbon materials.

These practices do have substantial costs involved however. Capital costs of equipment as well as further energy costs are incurred depending on the chosen technology and level of carbon dioxide management sought. The reliance on air separation techniques common in high efficiency and especially carbon sequestration applications is one substantial cost. Further notable costs of such systems are hydrogen production methods that typically rely on direct oxidation of fuel inputs which in turn puts a greater load on carbon capture systems. An alternative method of hydrogen production via electrolysis is emissions free, but even with onsite electricity production represents a steep energy penalty. Even state of the art staged reforming processes coupled to numerous complementary subsystems rely to a large extent on legacy practices of energy production through direct oxidation and may or may not manage the resulting carbon dioxide produced. What is needed is a superstructure that takes advantage of the level of maturity of such legacy processes while integrating advances in alternative energy sources.

SUMMARY

Many alternative energy systems such as solar and wind are extremely intermittent and add to the already existing complexity of a highly cyclical electricity demand. An ideal load following system should be capable of using any available process heat as well as efficiently accepting and storing excess electrical energy. Embodiments of the present invention accomplish this through the novel integration of hydrogen production with the indirect oxidation by carbochlorination of waste residues. Through this arrangement, heat is conserved and directed at hydrogen production and carbon dioxide formation is kept to a minimum. The carbochlorination process also provides for the use of red mud, or Bayer processing residue by capturing acid gases and ash from flue gas and processing the waste to remove valuable metals.

Electrolysis within the chlorinator directs excess electrical capacity at metal winning and chlorination. Heat produced by the electro-chlorination process would then be used for hydrogen production. This process heat could further contribute to high efficiency co-electrolysis of steam and carbon dioxide for high purity oxygen and hydrogen production. Such an arrangement incorporates various electrolysis/fuel cell stack technologies which, if designed to be reversible enough are a proven means of storing and using energy as hydrogen.

In one aspect, embodiments of the invention relate to a method for the integration of carbochlorination into a staged reforming operation. The method includes: delivering a carbonaceous feedstock to at least one thermal decomposition stage wherein the feedstock is volatized through at least one thermochemical decomposition process yielding a carbon gas stream and a produced ash; chlorinating the produced ash in a carbochlorination process to produce a chloride gas stream comprising metal chlorides, non-metal chlorides, and oxychlorides and a multi-phase residue comprising a molten or semi-molten salt, metal, or metal compound; and hydrolyzing at least some portion of the chloride gas stream within a molten salt hydrolyzer to produce a byproduct stream and recycling chlorine for use in the aforementioned carbochlorination process.

In another aspect, embodiments of the invention relate to a method for the integration of carbochlorination into a staged reforming operation. The method includes: converting a carbonaceous feedstock to a carbon gas stream and a produced ash; chlorinating the produced ash to produce a chloride gas stream; hydrolyzing at least some portion of the chloride gas stream with a basic pH reactant to produce a water gas; reacting a hydrogen or hydrocarbon gas with the carbon gas and the water gas to produce a synthesis gas; and utilizing an electrochemical cell comprising solid electrolytic membranes for separating or concentrating one or both of hydrogen and oxygen from the synthesis gas.

In further embodiment, the carbochlorination process enables grid scale power leveling and storage through variable operational modes, following grid load by varying power consumption.

In further embodiment, at least one of the carbon gas stream and the chloride gas stream are utilized within a reversible redox process operating as a flow battery.

In further embodiment, the chloride gas stream is produced when extra power is available and some portion of the chloride gas stream is later reintroduced into the carbochlorination process as a reactant to drive chlorination.

In further embodiment, the chloride gas stream includes at least one of aluminium chloride and silicon chloride.

In further embodiment, the carbon gas stream is reacted with hydrogen to form a hydrocarbon stream when extra power is available and said hydrocarbon stream is later burned as a fuel for peaking power.

In further embodiment, a series of molten salts are employed, utilizing distillation, vacuum distillation, chemical vapor transport, selective oxidation, and electrochemical processing to separate metals of interest from the chloride gas stream. In still further embodiment, two or more of the series of molten salts have at least one of different temperatures and differing compositions, and different separation techniques are employed to selectively remove metals of interest from the series of molten salts.

In further embodiment, at least some portion of the carbon gas stream, the chloride gas stream, or both are stripped of acidic elements and solids by contact with high pH material, the acidic elements and solids then being sent to the carbochlorination process.

In further embodiment, the carbochlorination process is operated within a temperature range of about 500 degrees centigrade to 1300 degrees centigrade and near or below atmospheric pressure, preferably from 800 to 1100 degrees, most ideally about 1000 degrees and from 1 to 0.01 atm.

In further embodiment, the chloride gas is passed from the carbochlorination process to a stripping salt which condenses some portion of the chloride gas and said stripping salt operates at about 400 to 800 degrees centigrade and at about atmospheric pressure, most preferably about 550 degrees.

In further embodiment, some portion of the stripping salt is heated, sparged, or both, with a gaseous complexing agent, such as aluminium chloride, selectively transporting condensed portions of the chloride gas, especially rare earth chlorides. In still further embodiment, the stripping salt includes chlorides of at least two elements selected from a group including alkali metals and alkaline earth metals, preferably sodium, lithium, or potassium, and most preferably ratios of selected metal chlorides are at or near eutectic amounts.

In further embodiment, the chloride gas is passed to an ionic liquid which condenses at least some portion of the chloride gas and the ionic liquid operates at about 100 to 200 degrees centigrade, preferably at about 110 degrees. In still further embodiment, the ionic liquid is electrolyzed to electrodeposit metals from some portion of the chloride gas condensed within the ionic liquid.

In further embodiment, the chloride gas is stripped of at least some chlorides before delivery to the molten salt hydrolyzer in which remaining chlorides are mostly converted to a non-gaseous form and rejected as a bulk byproduct.

In further embodiment, the molten salt hydrolyzer is operated within a temperature range of about 500 degrees centigrade to 1300 degrees centigrade and near or above atmospheric pressure, preferably from 800 to 1100 degrees, most preferably about 1000 degrees and 1 to 200 atm.

In further embodiment, the molten salt hydrolyzer comprises a pair of hydrolyzers consisting of a high temperature and pressure vessel (HTPV) and a low temperature and pressure vessel (LTPV), in which the LTPV precedes the HTPV for cleaning the chloride gas stream and the chloride gas stream is further cleaned of any remaining contaminates that might foul the HTPV. In still further embodiment, the high temperature and pressure vessel (HTPV) receives a gas stream nearly free of any chlorides or other contaminates and, using a supplemental feed of water and gaseous hydrocarbons, operates as a steam methane reactor and electrolysis/fuel cell combination utilizing solid electrolytes for selective electrochemical redox reactions within the molten salts or molten metals.

BRIEF DESCRIPTION OF DRAWINGS

FIG. 1 illustrates a flow chart of a process for chlorination and transport of chlorinated materials in accord with the present invention; and FIG. 2 illustrates one embodiment of a hypothetical high temperature synthesis gas electrodialysis cell stack.

DETAILED DESCRIPTION

The design of integrated gasification fuel cells (IGFC) are widely recognized as highly efficient but cost prohibitive. Embodiments of the present invention combine features of integrated gasification combined cycle (IGCC) and IGFC plants along with residue chlorination to form an integrated gasification and chlorination flow battery (IGCFB). Excess metal and non-metal chlorides produced during chlorination can be stored and introduced into the chlorinator to alter the chemistry of the electrolyte when needed. This is in contrast with typical flow batteries in that the electrolyte itself is not stored but reactants produced through extreme chlorination are stored and introduced back into the electrolyte to modify it when advantageous. The molten metals and salts themselves have a very high thermal inertia and when coupled with storable reactants are more than capable of dealing with cyclical and intermittent power distribution challenges as a highly variable load. This makes the intermittency of alternative energy sources such as wind and solar more manageable. Simultaneously this provides a path forward for the integration of nuclear or other clean baseload power and the production of bio or even carbon dioxide based synthetic fuels and chemicals.

Through exploiting a staged reforming operation utilizing hydrogen produced, oxidation of feedstock is minimized and hydrogenation is maximized. Feedstock impurities are internally managed and a plurality of options for their removal is available. Remineralization of materials, especially calcium and silicon, are beneficial in not only dealing with a large fraction of low-value byproducts in a benign way, but these byproducts can also be used for low carbon building materials or even carbon storage. This along with internal reprocessing of carbon dioxide relieves or eliminates the need for dedicated carbon capture subsystems and their attributed energy losses. Metals recovered from waste streams such as coal ash, electronic waste, mining and refinery tailings, etc. can offset the costs of these integrated comprehensive emissions and waste management systems substantially.

Embodiments of the present invention address the issue of grid scale storage especially in relation to coal fired power plants as well as the emissions management of the integrated processes. Heat amplification as well as emissions management is inherently embodied within the invention by multiple direct contact heat exchanges between integrated processes. Thermal energy accumulated in the high-temperature subsystems is dissipated through endothermic steam methane reactions producing bulk hydrogen for consumption by coupled processes. Within these high temperature subsystems, heat from the carbochlorination of pyrolysis residues is generated and supplemented through the hot-coupling of further integrated processes. Carbon dioxide generated in carbochlorination is stripped of metal chlorides and combined with produced hydrogen to form a synthesis gas. This synthesis gas is employed in the pyrolysis of the feedstock and the combined gases are sent to a hydrotreatment vessel for upgrading and removal of impurities such as sulfur, halogens, nitrogen, and heavy metals. Gaseous impurities such as hydrogen chloride and hydrogen sulfide can be removed from the gas stream following condensation of the higher molecular weight hydrocarbons and the remaining gases are further processed or recycled through the system. Base metals can be extracted as gaseous or liquid chlorides, separated and processed to oxides or another separable form, or removed through electro-deposition. Precious and noble metals are concentrated in a lead bullion and can be removed onsite or at a separate processing facility. Rare earth and radioactive elements present are concentrated by the carbochlorination and removed through any number of known methods. The remaining metal chlorides consisting substantially of alkali/alkaline chlorides as well as mineral oxides consisting substantially of silica or silicates with varying amounts of mixed oxide metals transfer their useful heat to the input streams and the chlorides may be utilized in a modified Solvay process producing ammonium chloride and carbonate minerals. Carbon dioxide not mineralized is further processed through a reverse water gas shift reactor or other dedicated processing equipment as part of the gas cleanup and processing or recycled through the system. Carbon management is thus handled through minimization of direct oxidation, mineralization, and synthesis gas reprocessing.

Full chlorination of all residues is preferred over the filtration of solids after a partial chlorination, because the resulting oxide residues could still carry some of the metals of interest away in their removal. Electrochemical processing in the chlorination vessel provides for high throughput, minimum processing steps, and importantly, energy storage. Chlorination agents such as calcium chloride, silicon chloride, aluminum chloride, or any mix of reactive chlorides can be produced and stored for later reintroduction to the chlorinator. Volatile chlorides would likely be condensed to remove any commercially valuable metals and for ease of storage, but molten salts could be stored in a hot thermal reservoir.

The preferred method of electrochemical processing would be to have a molten metal alloy form an electrode beneath the fused salt electrolyte. Lead seems the most ideal but other metals are suitable as well. This disclosure focuses for simplicity's sake on a lead alloy as the bottom of the melt liquid metal electrode, although it should be clear to one of ordinary skill that other embodiments are within the scope of the invention. As a cathode, the lead alloys with precious metals and removes them from the chlorination reaction. Optionally, it could further be used to reduce higher reactivity metals which would then be released back in to the molt salt for in situ fluxing. As an anode, the more reactive metals in the molten alloy would rejoin the molten salt phase. Metals such as aluminum and oxidizers such as sulfates could also be added directly to the crucible to regulate the chemistry. The opposing electrode, unless also made of molten metal, would likely need to be continually replaced. For example, a carbon-based alternating current electrode would allow for excellent reactivity but would need to be replaced regularly and add to operational costs. Some alternatives anode materials would be conducting metal oxides such as tin oxide or calcium ruthenate, for example. There is also the option of forming sacrificial electrodes of the materials to be processed through addition of a binder material and sintering. Finally, the use of solid electrolytes and inert anode materials could be exploited for their various benefits. For example, an array of inert anodes and collector cathodes could be submerged within the molten salt electrolyte. In such an arrangement, the molten metal phase could act as a bipolar electrode. Within this liquid metal bipolar electrode, submerged ion conducting ceramics such as beta alumina or stabilized zirconia can selectively transport cations and anions respectively.

FIG. 1 presents a flow chart of a process for chlorination and transport of chlorinated material in accord with the present invention. The process is presented in a pseudo-ordered form representing the flow of material, mostly concerning the chlorination and transport of chlorinated materials.

Thermal Decomposition (1.01) consists of at least one stage in which a carbonaceous feedstock is gasified and/or oxidized producing ash comprised mainly of inorganic materials.

Molten Salt Chlorination (1.02) denotes the reaction of inorganic materials present in the ash with carbon and chlorine compounds (chlorinating agents) to partially or fully chlorinate the residue. This process may be continuous, batch, or semi-continuous in operation. Semi-continuous operation provides the benefit of partially chlorinating the residue when grid electrical demand is high and fully chlorinating during off-peak times. Although many of the more noble metals can be chlorinated and volatilized, it is preferable to separate them from the chlorinator as a molten alloy. Using lead as the example solvent/cathode: In, Sn, Sb, Tl, Pb, Bi, Cu, Ge, Ag, Au, Mo, Ru, Rh, Pd, Re, Os, Ir, Pt and others could be removed in this manner.

Vapor Transport (1.03) denotes the separation of volatilized chlorides and oxychlorides leaving the chlorination reactor based on varying thermodynamic properties. With few exceptions, chlorides of the group 1 and 2 metals (alkali metals and alkaline earth metals) as well as the rare earths (Lanthanides, yttrium, and scandium) and naturally radioactive elements (uranium and thorium) melt between 400-800 centigrade and boil at over 1300. Thus Li, Be, Na, Mg, K, Ca, Rb, Sr, Cs, Ba, La, Ce, Pr, Nd, Sm, Eu, Gd, Tb, Dy, Ho, Er, Tm, Yb, Lu, Sc, Y, Th, U and others will stay in a molten salt phase with low vapor pressure at roughly 500-900. Potassium is a notable exception and along with aluminum, these chlorides form gas complexes capable of transporting otherwise low-volatility rare earth chlorides. This feature is exploited to remove valuable metals from the chlorination crucible in a continuous or semi-continuous process by raising the temperature over 900 and introducing excess aluminum chloride.

Mid-Temp Condenser (1.04) is used to capture transported rare earth chlorides and further separate and purify them. To reach suitably low temperatures so as to prevent valuable elements from being lost, eutectic molten salts may be used. Alternatively, a replaceable heat exchanger can be regularly replaced to remove condensed chlorides.

Rare Earth Separation (1.05) may optionally be used to separate rare earth and radioactive elements if the Mid-Temp Condenser is not designed simply to remove rare earth and radioactive elements in bulk.

Low-Temp Condenser (1.06)—may optionally be employed if highly volatile chlorides like silicon and aluminum are to be separated out. Most inorganic molten salts, including eutectics, only melt above roughly 400. Molten salts below this temp are typically a mixed organic/inorganic chloride referred to typically as ionic liquids. A number of these are suitable for condensing low boiling point chlorides and oxychlorides.

Electro-Deposition (1.07) may optionally be used if other highly volatile (oxy)chlorides like those of V, Ti, Ta, Nb, Hf, Fe, Zr, etc. are to be removed. This can be done selectively or in bulk from the low melting point ionic liquid.

Molten Salt Hydrolysis (1.08) operates to remove one or more of the chlorides produced by chlorination. Hydrocarbons in general but especially light hydrocarbons and water are reacted in a molten salt. Chlorides present in the input streams can be captured in the molten salt as well. By controlling the chemistry of the salt, any number of the chlorides produced by chlorination can be removed from the system. Carbonates, sulfides, and other compounds may be removed as well.

Bulk Material Rejection (1.09) removes undesirable elements remaining in the molten salt hydrolysis. Silicon and calcium will be a large fraction of most input streams. These along with other elements can be removed from the molten salt hydrolysis as a solid residue. This bulk material rejection stream could also form an input stream to a number of processes such as the production of fertilizers, geopolymers, zeolytes, and a whole range of aqueous acid/base processes.

Solid Oxide Electrodialysis (1.10) employs an electrochemical cell to extract hydrogen and oxygen from a synthesis gas stream. Electrodialysis controls the behavior of ionic concentrations in an electrochemical cell. Solid oxide ceramics are often used in fuel cell stacks operated at high temperatures and often with molten cell components. Proposed is a high temperature electrodialysis cell operating on a synthesis gas stream. The exact details of the design are less important than the benefits of being able to extract hydrogen and oxygen from a simultaneous steam methane reforming reaction. Beta Alumina Solid Electrolyte (BASE) is a solid ionic conductor used to transport cations in a vast number of electrochemical devices. Other cationic or protonic conductors exist but for simplicity, BASE makes an ideal cationic membrane. Yttria-Stabalized Zirconia (YSZ) makes an ideal anionic membrane, again others exist as well. Often cermets, with properties of both ceramics and metals, are used as electrode interfaces with these ionic membranes, but liquid metals have been used as well. A special case is the use of silver as an inert liquid anode capable of bubbling oxygen off. Other molten electrodes such as tin and antimony have been looked at for use in direct carbon fuel cells with varying degrees of success. Most solid electrolytes only operate well at over roughly 500-700 and preferably around 1000. At the highest temperatures co-electrolysis of steam and carbon dioxide becomes more efficient and a number of molten electrode options become available. At higher operating temperatures material tolerances are much lower and inputs need to be made nearly free of any possible poisons to whatever materials are used for the electroactive components. Often that means sulfur and halogens as well as others need to be removed to nearly undetectable limits.

FIG. 2 depicts a proposed regenerative cell stack for the separation of hydrogen and oxygen from a synthesis gas stream as discussed above in connection with 1.10. In both FIG. 2.1 and FIG. 2.2, the anode is separated from the synthesis gas by a solid anionic conductor and the cathode is separated by a cationic or proton conducting ceramic. Both embodiments may use conventional cermet electrodes or alternatively employ liquid electrodes. Similarly, the syngas may be diffused within a porous cermet or within a fused salt or molten metal, in which case the molten metal would act as a bipolar electrode or may have its own imposed voltage. FIG. 2.1 shows the stack operating in electrolysis mode, producing hydrogen at the anode and oxygen at the cathode. FIG. 2.2 shows the stack reversed to produce electricity from the concentrated fuel and oxygen input streams. Furthermore, the anode and cathode portions of the stack are independently reversible. For example, the anode could be consuming (oxidizing) methane while the cathode produces hydrogen.

Element 2.01 represents a solid cation transport membrane. Element 2.02 represents a solid anion transport membrane. Element 2.03 represents a hydrogen rich gas stream. Element 2.04 represents an unreacted synthesis gas stream. Element 2.05 represents a reacted synthesis gas stream. Element 2.06 represents an oxygen rich gas stream. Element 2.07 represents a cathodic channel. Element 2.08 represents a syngas channel. Element 2.09 represents an anodic channel.

The number of advantages offered by combining chlorination and electrochemical processing are numerous but the main one would be raising the reaction kinetics and use or storage of what would typically be waste heat production. Carbochlorination is the first processing step and removes carbon and oxygen as gas. All metals that aren't part of a molten cathode or electrolyte will be volatilized as well. The volatilization can be controlled through heat and pressure primarily but can also be assisted by complex gas formers such as aluminum chloride or potassium chloride. These chemical vapor transport processes utilizing aluminum chloride complex gases have been well explored by researchers mainly in China and Japan. Those familiar in the art of rare earth beneficiation, ion exchange, and solvent extraction methods would immediately recognize the advantage of this method. "Extractive Metallurgy of Rare Earths, Second Edition" (2015) by Nagaiyar Krishnamurthy and Chiranjib Kumar Gupta, the entire contents of which are hereby incorporated within as if set forth in its entirety, covers rare earth processing and section 3.6.6.17 in particular covers the dry process of chemical vapor transport. Exploiting this phenomenon, volatile chlorides could then be captured in a second (or series of) molten salt(s) at a lower temperature. At the lowest temperatures, only chlorides of boron, silicon, and carbon would still be volatile, along with carbon oxides and other light gases. Further electro-winning could be done in the series to electrodeposit iron and related metals if desired. The remaining chlorides could be condensed from the gas and fed back into the chlorinator or reacted with water to form oxides. A further series of chemical vapor transport from the second (cleaned) molten salt could be used to concentrate and separate the rare earth chlorides. At this point, a relatively high concentration of rare earths is achievable. They can be further separated from each other through traditional aqueous processing, ion exchange, etc. Alternatively, after stripping the carbochlorination gas stream of rare earth and radioactive chlorides, the gas can be introduced to a molten salt hydrolysis reactor to remove the remaining chlorides as solid oxides.

This combination provides a minimal set of processing steps for obtaining a rare earth concentrate from low grade or waste resources, especially coal ash. Some steels and alloys are suitable to resist the corrosive environment, especially nickel alloys and especially under a cathodic potential. Graphite, quartz, silicon carbide, silicon aluminum oxy nitride (SiAlON) and other refractories would also be suitable. Cooling the crucible to solidify part of the melt and forming a protective barrier may be utilized, as practiced in aluminum processing.

In one embodiment, the methods described by the invention are utilized in a large scale combined cycle polygeneration plant providing electricity, heating, cooling, and fresh water to a large metropolitan area. Capitalizing on economies of scale, such a superstructure could operate on advantageous feed-in tariffs for the disposal of a variety of wastes over a wide geographical area. It would further be capable of integrating distributed generation into its regional power grid through a plurality of operational modes, operating high energy demand subsystems during off-peak hours while lowering chemical output and instead utilizing that chemical energy during periods of high demand. The full integration provides for coal, gas, biomass, and waste to electricity, liquids, and metals through operating as an integrated gasification and chlorination flow battery for grid scale load following.

In a further embodiment, the invention is applied to retrofit existing coal fired power plants. Bottom ash is sent directly to carbochlorination. Flue gas is treated with Bayer processing residue, which proceeds to carbochlorination as well. The flue gas is then reacted with processed alkali or alkaline materials, mineralizing some portion of the carbon dioxide. Remaining carbon dioxide is co-electrolyzed with water and light hydrocarbons. The resulting syngas and hydrogen are used to upgrade carbonaceous and waste materials to liquids. Retrofitting may be scaled to process some or all of the gaseous emissions, solid wastes, or both from existing plants.

Embodiments of the present invention find industrial applicability in many areas, including but not limited to the clean energy industry, electrical generation, and distribution industries. Embodiments of the present invention also finds industrial applicability in the pollution management and environmental footprint context of using waste processing as a variable load for grid scale load following.

Having illustrated and described the principles of the system and method of the present invention in various embodiments, it should be apparent to those skilled in the art that the embodiments can be modified in arrangement and detail without departing from such principles. For example, the carbonaceous feedstock may be entirely consumed on site if preferred. Therefore, the illustrated embodiments should be considered only as example of the invention and not as a limitation on its scope.

Although the description above contains much specificity, these should not be construed as limiting the scope of the invention but as merely providing illustrations of some of the embodiments of this invention. Further, it is appreciated that the scope of the present invention encompasses other embodiments which may become obvious to those skilled in the art, and that the scope of the present invention is accordingly limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims.

REFERENCES

U.S. Pat. No. 7,396,440 discloses a grid scale system of load leveling and electrolysis using a vanadium based flow battery.

US20150159126 discusses a system for hydrogen production and sequestration using a molten salt gasifier for a variety of carbonaceous feedstocks.

U.S. Pat. No. 8,309,049 discloses a molten metal(salt) reactor for the production of hydrogen.

U.S. Pat. No. 8,637,197 discloses a reversible flow battery system for grid storage utilizing a solid oxide electrochemical cell.

U.S. Pat. No. 3,296,030 discloses the use of a stabilized zirconia solid electrolyte fuel cell.

US20150203979 discusses the recovery of rare earth elements from a molten salt.

U.S. Pat. No. 8,313,624 discloses inert anode materials for use in electrochemical cells.

U.S. Pat. No. 3,650,730 discloses the purification of aluminum in a fused halogen salt.

US20140212347 discusses recovery of lead from electronic waste using a molten salt extraction process.

U.S. Pat. No. 8,470,271 discloses chlorination and recovery of metals from a fused salt.

U.S. Pat. No. 4,475,993 discloses the extraction of trace metals from fly ash using a fused salt.

"Novel applications of ionic liquids in materials processing," Ramana G Reddy in Journal of Physics: Conference Series 165 (2009) discusses the use of ionic liquids for electrodeposition of aluminum alloys.

What is claimed is:

1. A method for the integration of carbochlorination into a staged reforming operation, the method comprising:
   delivering a carbonaceous feedstock to at least one thermal decomposition stage wherein the feedstock is volatized through at least one thermochemical decomposition process yielding a carbon gas stream and a produced ash;
   chlorinating the produced ash in a carbochlorination process to produce a chloride gas stream comprising metal chlorides, non-metal chlorides, and oxychlorides and a multi-phase residue comprising a molten or semi-molten salt, metal, or metal compound; and
   hydrolyzing at least some portion of the chloride gas stream to produce an oxide byproduct stream and a hydrogen chloride stream.

2. A method for the integration of carbochlorination into a staged reforming operation, the method comprising:
   converting a carbonaceous feedstock to a carbon gas stream and a produced ash;
   chlorinating the produced ash to produce a chloride gas stream;
   hydrolyzing at least some portion of the chloride gas stream with a basic pH reactant to produce a water gas;
   reacting a hydrogen or hydrocarbon gas with the carbon gas and the water gas to produce a synthesis gas; and
   utilizing an electrochemical cell comprising solid electrolytic membranes for separating or concentrating one or both of hydrogen and oxygen from the synthesis gas.

3. The method of claim 1 or 2, wherein
   the carbochlorination process enables grid scale power leveling and storage through variable operational modes, following grid load by varying power consumption.

4. The method of claim 1 or 2, further comprising
   at least one of the carbon gas stream and the chloride gas stream are utilized within a reversible redox process operating as a flow battery.

5. The method of claim 1 or 2, further comprising
   producing the chloride gas stream when extra power is available and later reintroducing some portion of the chloride gas stream into the carbochlorination process as a reactant to drive chlorination.

6. The method of claim 1 or 2, wherein the chloride gas stream includes at least one of aluminium chloride and silicon chloride.

7. The method of claim 1 or 2, further comprising reacting the carbon gas stream with hydrogen to form a hydrocarbon stream when extra power is available and later burning said hydrocarbon stream as a fuel for peaking power.

8. The method of claim 1 or 2, wherein a series of molten salts are employed, utilizing distillation, vacuum distillation, chemical vapor transport, selective oxidation, and electrochemical processing to separate metals of interest from the chloride gas stream.

9. The method of claim 8, wherein two or more of the series of molten salts have at least one of different temperatures and differing compositions, and employing different separation techniques to selectively remove metals of interest from the series of molten salts.

10. The method of claim 1 or 2, further comprising stripping at least some portion of the carbon gas stream, the chloride gas stream, or both of acidic elements and solids by contact with high pH material, the acidic elements and solids then being sent to the carbochlorination process.

11. The method of claim 1 or 2, wherein the carbochlorination process is operated within a temperature range of about 500 degrees centigrade to 1300 degrees centigrade and near or below atmospheric pressure.

12. The method of claim 1 or 2, wherein the chloride gas is passed from the carbochlorination process to a stripping salt which condenses some portion of the chloride gas and said stripping salt operates at about 400 to 800 degrees centigrade and at about atmospheric pressure.

13. The method of claim 12, wherein some portion of the stripping salt is heated, sparged, or both, with a gaseous complexing agent, selectively transporting condensed portions of the chloride gas.

14. The method of claim 12, wherein the stripping salt comprises chlorides of at least two elements selected from a group including alkali metals and alkaline earth metals.

15. The method of claim 12, wherein the chloride gas is passed to an ionic liquid which condenses at least some portion of the chloride gas and the ionic liquid operates at about 100 to 200 degrees centigrade.

16. The method of claim 15, further comprising electrolyzing the ionic liquid to electrodeposit metals from some portion of the chloride gas condensed within the ionic liquid.

17. The method of claim 1, wherein at least some portion of the chloride gas stream is hydrolyzed within a molten salt hydrolyzer.

18. The method of claim 17, further comprising stripping the chloride gas of at least some chlorides before delivery to the molten salt hydrolyzer in which remaining chlorides are mostly converted to a non-gaseous form and rejected as a bulk byproduct.

19. The method of claim 17, wherein the molten salt hydrolyzer is operated within a temperature range of about 500 degrees centigrade to 1300 degrees centigrade and near or above atmospheric pressure.

20. The method of claim 17, wherein the molten salt hydrolyzer comprises a pair of hydrolyzers consisting of a high temperature and pressure vessel (HTPV) and a low temperature and pressure vessel (LTPV), in which the LTPV precedes the HTPV for cleaning the chloride gas stream and the chloride gas stream is further cleaned of any remaining contaminates that might foul the HTPV.

21. The method of claim 20, wherein the high temperature and pressure vessel (HTPV) receives a gas stream nearly free of any chlorides or other contaminates and, using a supplemental feed of water and gaseous hydrocarbons, operates as a steam methane reactor and electrolysis/fuel cell combination utilizing solid electrolytes for selective electrochemical redox reactions within the molten salts or molten metals.

* * * * *